United States Patent
Jung

(10) Patent No.: US 7,836,478 B2
(45) Date of Patent: Nov. 16, 2010

(54) ETHERNET PORT CONTROL METHOD AND APPARATUS OF DIGITAL BROADCASTING SYSTEM

(75) Inventor: Byeong-Woo Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 11/404,036

(22) Filed: Apr. 14, 2006

(65) Prior Publication Data
US 2007/0033628 A1 Feb. 8, 2007

(30) Foreign Application Priority Data
Aug. 8, 2005 (KR) .................. 10-2005-0072490

(51) Int. Cl.
*H04N 7/16* (2006.01)
*H04N 7/173* (2006.01)
(52) U.S. Cl. .................. 725/111; 725/117; 725/147
(58) Field of Classification Search ............. 370/389, 370/490, 352 M, 249, 401, 204, 480; 725/110, 725/111, 117, 147, 2, 82
See application file for complete search history.

(56) References Cited

U.S. PATENT DOCUMENTS

| | | | |
|---|---|---|---|
| 2004/0037217 A1* | 2/2004 | Danzig et al. | 370/204 |
| 2005/0027851 A1* | 2/2005 | McKeown et al. | 709/224 |
| 2006/0045021 A1* | 3/2006 | Deragon et al. | 370/249 |
| 2007/0195824 A9* | 8/2007 | Chapman et al. | 370/490 |
| 2008/0209494 A1* | 8/2008 | Dravida et al. | 725/129 |

* cited by examiner

*Primary Examiner*—Melody Mehrpour
(74) *Attorney, Agent, or Firm*—H.C. Park & Associates, PLC

(57) ABSTRACT

In an Ethernet port control method and apparatus of a digital broadcasting system, a head-end is caused to physically block functions of an Ethernet port disposed in a set-top box in order to prevent an unauthenticated device from accessing a cable modem termination system (CMTS) from the head-end through the Ethernet port in the set-top box for a malicious purpose, such as hacking. The Ethernet port control apparatus includes a head-end for providing a control message, including port closing information, for preventing abuse of an Ethernet port, and a set-top box for resetting the Ethernet port according to the port closing information, thereby closing the Ethernet port when the control message is received from the head-end.

13 Claims, 3 Drawing Sheets

ETHERNET PORT CONTROL METHOD AND APPARATUS OF DIGITAL BROADCASTING SYSTEM

CLAIM OF PRIORITY

This application makes reference to, incorporates the same herein, and claims all benefits accruing under 35 U.S.C. §119 from an application earlier filed in the Korean Intellectual Property Office on the 8 of Aug. 2005 and there duly assigned Ser. No. 10-2005-0072490.

BACKGROUND OF THE INVENTION

1. Technical Field

The present invention relates to an Ethernet port control method and apparatus of a digital broadcasting system.

2. Related Art

In general, a set-top box has a built-in cable modem or is connected with a cable modem disposed outside, and enables digital terminals such as a digital television (TV) and a personal computer (PC) to output image and voice information included in an analog signal received from a head-end.

The broadcast information received from the head-end is converted into a digital signal/analog signal by a cable modem termination system (CMTS), and is transmitted to the set-top box through a cable network.

Broadcast signals containing broadcast information transmitted to a set-top box through a cable network are based on data-over-cable service interface specifications (DOCSIS). DOCSIS is a protocol applied to data exchange between a head-end and a set-top box which are connected via a cable network, and relates to regulations including at least one of modulation methods and transmission rates depending on whether data is transmitted upstream or downstream.

Through a set-top box, a user can be provided with not only broadcast information but also various services based on Internet protocol (IP).

However, it is possible to connect an unknown device to an Ethernet port, and to access a head-end through CMTS for hacking or other malicious purposes.

Therefore, to prevent such hacking, the head-end blocks a route through which the CMTS and set-top box are connected using a software-based method.

In other words, the head-end closes the route connecting the CMTS and set-top box using a software-based technique to thereby preventing hacking.

However, cable network providers may consider it to be an inefficient use of service resources for a head-end itself to close a cable network to prevent hacking, and in any event such a method cannot perfectly prevent hacking.

SUMMARY OF THE INVENTION

It is an object of the present invention to provide an Ethernet port control method and apparatus of a digital broadcasting system, the method and apparatus sending a message regardless of closing of a cable network connecting a CMTS of a head-end and a set-top box of a user, physically blocking functions of an Ethernet port disposed in the set-top box, and thereby preventing hacking via a cable network.

According to an aspect of the present invention, a digital broadcasting system comprises a head-end which provides a control message including port closing information to prevent abuse of an Ethernet port, and a set-top box which resets the Ethernet port according to the port closing information, and thereby physically closes the Ethernet port when the control message is received from the head-end.

The set-top box may include a storage which stores a port control signal corresponding to the port closing information, a controller which searches for and provides the port control signal corresponding to the port closing information when the control message is received from the head-end, and a port closer which resets the Ethernet port according to the port control signal provided by the controller.

According to another aspect of the present invention, a port control method of a digital broadcasting system, which includes a head-end and set-top box, comprises the steps of: transmitting, at the head-end, a control message including port closing information to the set-top box in order to prevent abuse of an Ethernet port; searching, at the set-top box, for a control signal corresponding to the port closing information from at least one predetermined control signal; and closing, at the set-top box, the Ethernet port according to the searched control signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
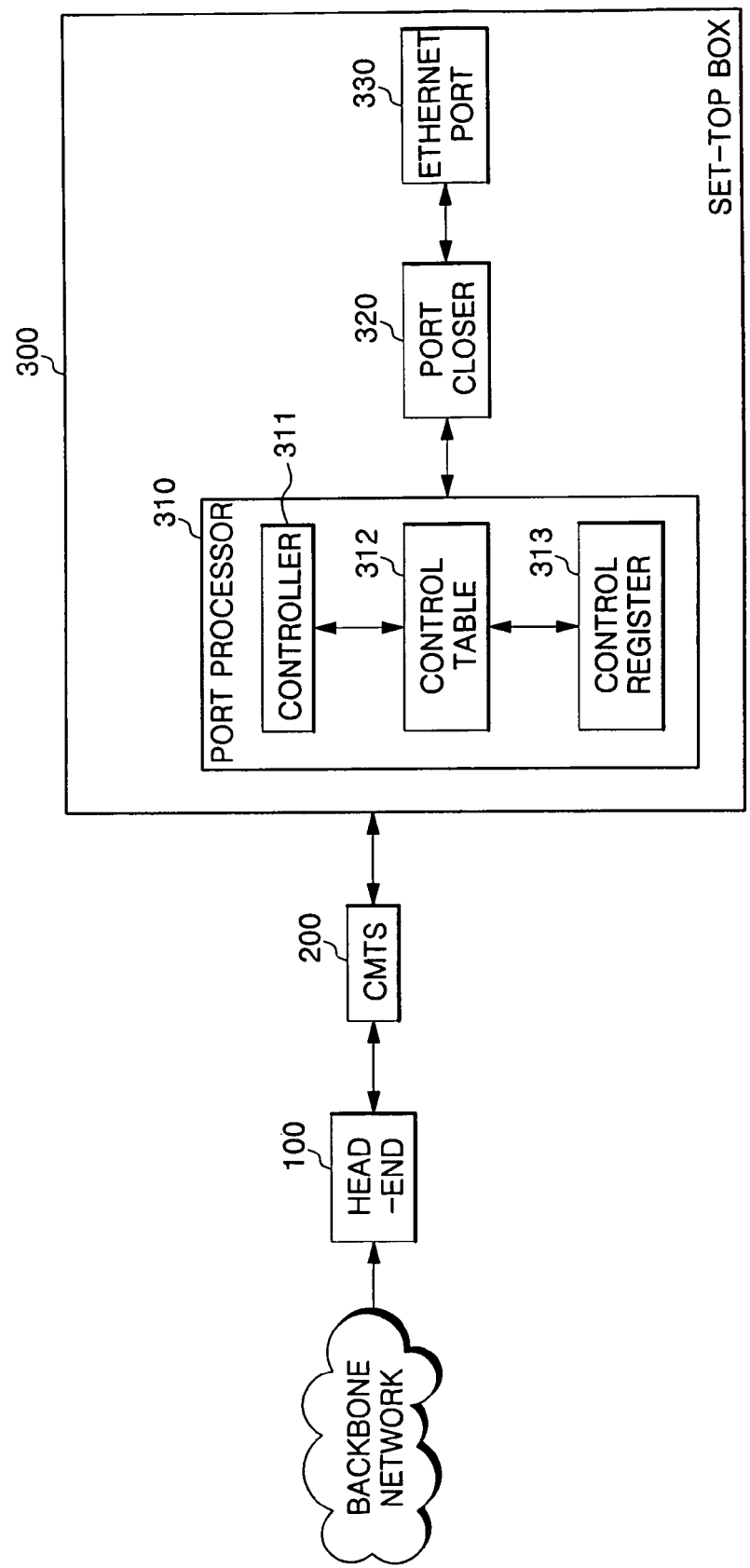
FIG. 1 is a block diagram of a digital broadcasting system according to the present invention.

Hereinafter, exemplary embodiments of the present invention will be described in detail with reference to the accompanying drawings. Like elements are denoted by like reference numerals throughout the drawings. Matters related to the present invention and well-known in the art will not be described in detail when it is deemed that such description would detract from the clarity and concision of the disclosure.

FIG. 1 is a block diagram of a digital broadcasting system according to the present invention.

Referring to FIG. 1, the digital broadcasting system comprises a head-end 100, a cable modem termination system (CMTS) 200, and a set-top box 300.

The set-top box 300 includes a port processor 310, a port closer 320, and an Ethernet port 330.

The port processor 310 includes a controller 311, a control table 312, and a control register 313.

The head-end 100 provides broadcast information received from a backbone network to the set-top box 300 through the CMTS 200.

In order to prevent an unauthenticated device from maliciously using the Ethernet port 330, the head-end 100 provides a control message which includes closing information for physically blocking functions of the Ethernet port 330 to the set-top box 300.

The CMTS 200 converts the broadcast information or control message received from the head-end 100 into a format which can be transmitted through a cable network, and transmits the converted broadcast information or control message to the set-top box 300.

In addition, the broadcast information or control message transmitted by the CMTS 200 is based on data-over-cable service interface specifications (DOCSIS) and is transmitted to the set-top box 300 through the cable network.

The set-top box 300 decodes the analog broadcast signal received from the CMTS 200 according to a predetermined protocol, thereby generates a digital broadcast signal (i.e., an image signal and a voice signal), and provides the generated broadcast signal to a digital television (TV) (not shown in the drawings).

The port processor 310 generates a closing control signal corresponding to the closing information included in the control message received from the head-end 100.

In addition, the port processor 310 transmits the generated closing control signal to the port closer 320. When the port closer 320 receives the closing control signal, a port closing function is activated, and thus the port closer 320 physically blocks the functions of the Ethernet port 330.

Specifically, the port processor 310 transmits the control signal for controlling the Ethernet port 330 to the port closer 320.

The control table 312 sets up a control command as at least one information field value included in the control message received from the head-end 100.

As an example, when "1" has been set up in a closing information field, the control table 312 can set up a control command, "Ethernet port off."

And when "0" has been set up in a command information field, the control table 312 can set up a control command, "Ethernet port on."

The control register 313 stores the closing control signal according to the closing control command which has been set up in the control table 312.

When the control message is received from the head-end 100, the controller 311 compares a value of the closing information field included in the control message with setup information that has been previously stored in the control table 312.

As an example, when "1" has been set up in the closing information field, the controller 311 can notice that setup information corresponding to "1" of the closing information field is the control command, "Ethernet port off" in the control table 312.

Also, the controller 311 obtains setup information corresponding to a value of the closing information field from the control table 312, generates a closing control signal corresponding to the obtained setup information, and transmits the closing control signal to the port closer 320, thereby turning on functions of the port closer 320.

When the closing control signal corresponding to the port closing information is received from the port processor 310, the port closer 320 resets the Ethernet port 330, restricting its functions.

The Ethernet port 330 provides an Internet protocol (IP)-based service received from the head-end 100 to a digital terminal (not shown in the drawings) such as a digital TV or a personal computer (PC), thereby serving as an interface.

Figure 2:
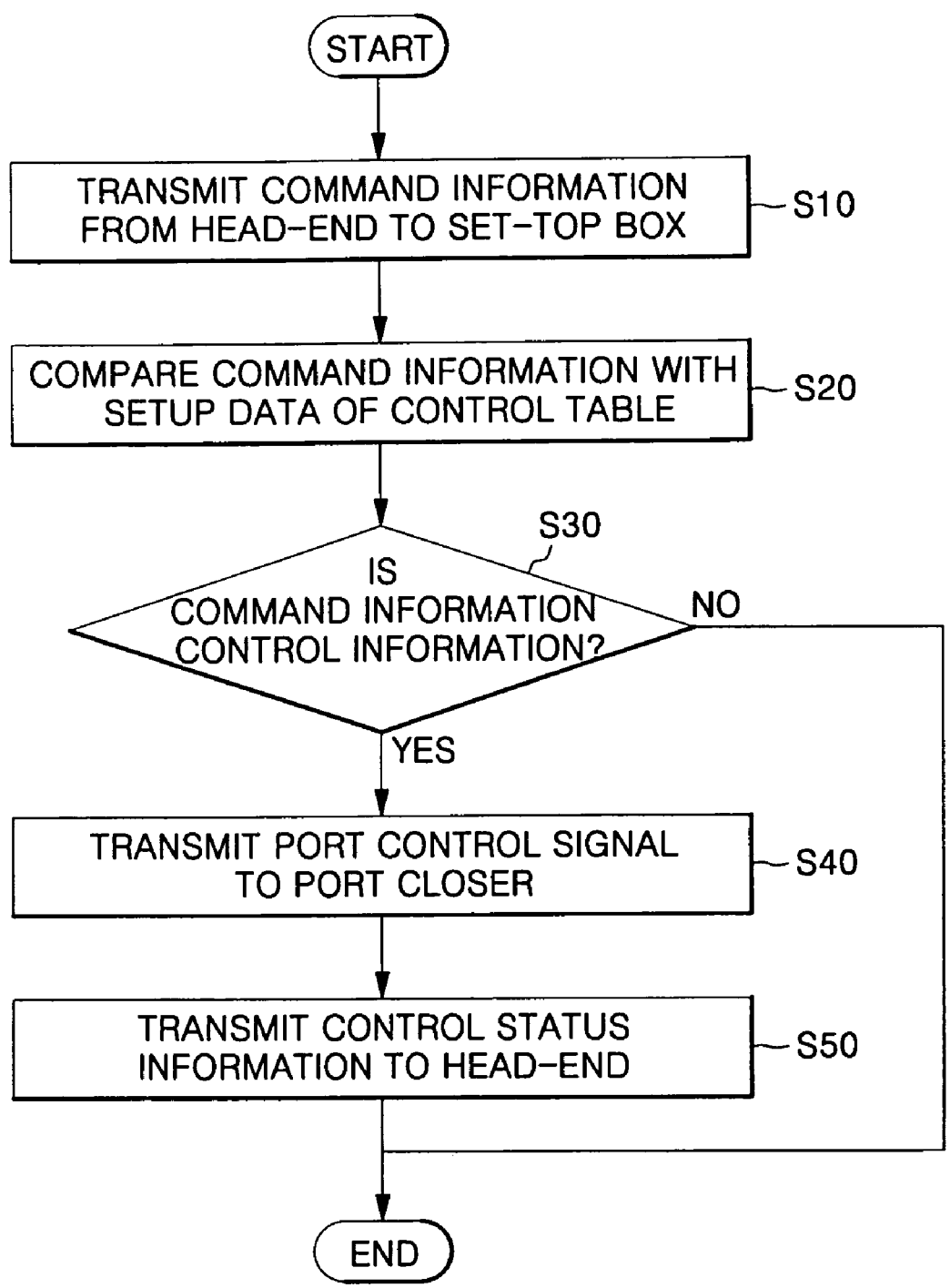
FIG. 2 is a flowchart showing an Ethernet port control method of a digital broadcasting system according to the present invention.

FIG. 2 is a flowchart showing an Ethernet port control method of a digital broadcasting system according to the present invention.

Referring to FIG. 2, a device which is connected to the Ethernet port 330 in the set-top box 300 for a malicious purpose, such as hacking, may be connected to the set-top box 300 through the Ethernet port 330, and to the head-end 100 through a cable network connecting the set-top box 300 and the CMTS 200.

In order to prevent an unauthenticated device from being connected to the head-end 100 for a malicious purpose such as hacking, the head-end 100 transmits a control message including closing information for physically closing the Ethernet port 330 to the set-top box 300 through the CMTS 200 (S11).

The head-end 100 adds the Ethernet port closing information to the control message which is periodically transmitted, and transmits the control message to the set-top box 300 through the CMTS 200, or adds the port closing information to the control message and transmits the control message only when a signal is sensed from an unauthenticated device.

In this regard, the control message is a message based on the DOCSIS, and can be transmitted in a media access control (MAC) frame format.

Figure 3:
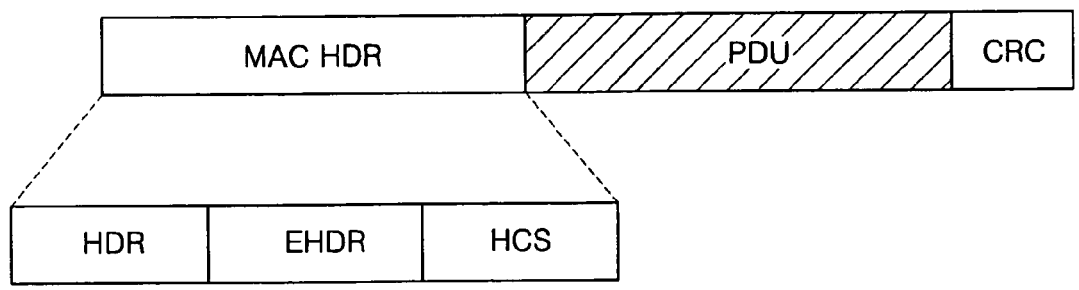
FIG. 3 is a view of the structure of an Ethernet port control message according to the present invention.

FIG. 3 is a view of the structure of an Ethernet port control message according to the present invention.

As illustrated in FIG. 3, the control message can be transmitted in a MAC frame format based on the DOCSIS which is a cable modem transmission standard.

The MAC frame comprises a MAC header (MAC HDR), a packet data unit (PDU), and a cyclic redundancy check (CRC). The MAC header includes a header (HDR), an extension header (EHDR), and a header check sequence (HCS).

The head-end 100 sets up one field, from at least one field included in the packet data unit, as an Ethernet port control field, adds Ethernet port closing information to the setup field, and transmits the field to the set-top box 300 through the CMTS 200.

Referring back to FIG. 2, CMTS 200 converts the broadcast information or the control message for controlling the Ethernet port 330 into a format that can be transmitted through the cable network, and transmits the converted broadcast information or control message to the set-top box 300 (S11).

The controller 311 of the port processor 310 compares the closing information included in the control message received from the head-end 100 with setup information that has been previously stored in the control table 312 (S20).

As an example, when the closing information included in the control message is "1," the control table 312 is set up as "Ethernet port off," or when the closing information is "0," the control table 312 is set up as "Ethernet port on."

After comparing the closing information included in the control message with the setup information previously stored in the control table 312, the controller 311 determines whether the command information is control information (S30).

The controller 311 obtains the control command information corresponding to the closing information included in the control message, and generates a closing control signal corresponding to the control command information from the control register 313.

As an example, when the closing information is set up as "1" in a closing information field, the controller 311 generates a closing control signal corresponding to "Ethernet port off."

The port processor 310 transmits the generated closing control signal to the port closer 320 (S40).

When the closing control signal based on the control command, "Ethernet port off" is received, the port closer 320 resets at least one control signal transmitted to the Ethernet port 330, and thus closes the Ethernet port 330.

When the Ethernet port 330 is turned off, the port processor 310 generates status information according to the status, and transmits the status information to the head-end 100 (S50).

Meanwhile, the head-end 100 manages status information of the Ethernet port 330 of each set-top box 300 using status information received from the port processor 320, and indicates whether the Ethernet port 330 is turned on or off.

As described in detail above, the exemplary embodiments of the present invention relate to the case where the Ethernet port 330 is controlled in a digital broadcasting system. However, in other networks as well, the Ethernet port 330 can be controlled in the same manner so as to prevent an unknown device from accessing it for malicious purposes.

According to the present invention, in order to prevent an unknown device from accessing the Ethernet port of the set-top box for a malicious purpose, such as hacking, the head-end adds the Ethernet port closing information to the control message provided to the set-top box, transmits the control message to the set-top box, and thus physically blocks the functions of the Ethernet port. Therefore, it is possible to manage a cable network more efficiently than closing the cable network itself In addition, since the Ethernet port is physically closed, it is possible to prevent hacking more thoroughly.

While the present invention has been described with reference to exemplary embodiments thereof, it will be understood by those skilled in the art that various changes in form and detail may be made therein without departing from the scope of the present invention as defined by the following claims.

What is claimed is:

1. A digital broadcasting system, comprising:
a head-end configured to provide a control message, the control message comprising Ethernet port closing information;
and
a set-top box configured to reset an Ethernet port according to the Ethernet port closing information, thereby physically closing the Ethernet port in response to receipt of the control message from the head-end.

2. The digital broadcasting system of claim 1, wherein the head-end is configured to set the Ethernet port closing information in a field of one message among messages based on data-over-cable service interface specifications (DOCSIS), thereby generating the control message.

3. The digital broadcasting system of claim 2, wherein the field is a packet data unit (PDU) of a media access control (MAC) frame.

4. The digital broadcasting system of claim 1, wherein the set-top box comprises:
a controller configured to generate an Ethernet port control signal according to the Ethernet port closing information in response to receipt of the Ethernet port closing information from the head-end; and
a port closer configured to reset the Ethernet port according to the Ethernet port control signal generated by the controller.

5. An Ethernet port control method of a digital broadcasting system comprising a head-end and a set-top box, the method comprising:
receiving, at the set-top box from the head-end, a control message comprising Ethernet port closing information;
generating a control signal corresponding to the Ethernet port closing information; and
closing an Ethernet port according to the control signal.

6. The Ethernet port control method of claim 5, wherein the head-end is configured to set the Ethernet port closing information in a field of one message among messages according to data-over-cable service interface specifications (DOCSIS), thereby generating the control message.

7. A digital broadcasting system, comprising:
a head-end configured to generate a control message the control message comprising Ethernet port closing information and being based on data-over-cable service interface specifications (DOCSIS); and
a set-top box configured to physically close an Ethernet port in response to reception of a control message from the head-end, by resetting the Ethernet port based on the Ethernet port closing information.

8. The digital broadcasting system of claim 7, wherein the head-end is configured to generate the control message by inserting the Ethernet port closing information within a field of one message among other messages.

9. The digital broadcasting system of claim 7, wherein the set-top box comprises:
a controller configured to generate an Ethernet port control signal based upon the Ethernet port closing information response to receipt of the Ethernet port closing information from the head-end; and
a port closer configured to reset the Ethernet port according to the Ethernet port control signal, in response to receipt of the Ethernet port control signal.

10. The digital broadcasting system of claim 9, wherein the head-end is configured to generate the control message by inserting the Ethernet port closing information within a field of one message among other messages.

11. The digital broadcasting system of claim 7, wherein the set-top box comprises:
a controller configured to generate an Ethernet port control signal based upon the Ethernet port closing information in response to receipt of the Ethernet port closing information from the head-end; and
a port closer configured to reset the Ethernet port according to the Ethernet port control signal, in response to receipt of the Ethernet port control signal.

12. The digital broadcasting system of claim 11, wherein the head-end is configured to generate the control message by inserting the Ethernet port closing information within a field of one message among other messages.

13. A digital broadcasting system, comprising:
a set-top box configured to control an Ethernet port according to Ethernet port closing information contained within a control message by physically opening or closing the Ethernet port in response to receipt of the control message from a head-end.

* * * * *